United States Patent [19]
Kobelt

[11] 4,393,962
[45] Jul. 19, 1983

[54] SELF-CENTERING DEVICE FOR CALIPER BRAKE ASSEMBLY

[76] Inventor: Jacob Kobelt, 6110 Oak St., Vancouver, British Columbia, Canada, V6M 2W2

[21] Appl. No.: 240,906

[22] Filed: Mar. 5, 1981

[51] Int. Cl.³ .................................... F16D 55/224
[52] U.S. Cl. .................................. 188/72.6; 188/59
[58] Field of Search ............... 188/46, 59, 72.6, 72.9, 188/204 R

[56] References Cited

U.S. PATENT DOCUMENTS

| 278,471 | 5/1883 | Turner | 188/46 |
|---|---|---|---|
| 2,440,020 | 4/1948 | Pratt | 188/59 |
| 2,527,072 | 10/1950 | Pogue | 188/59 |
| 2,590,062 | 3/1952 | Bachman | 188/59 |
| 2,856,033 | 10/1958 | McGuire | 188/59 |
| 4,060,153 | 11/1977 | Kobelt | 188/72.6 |
| 4,155,431 | 5/1979 | Johnson | 188/59 |

FOREIGN PATENT DOCUMENTS 219107  1/1958  Australia .

*Primary Examiner*—Duane A. Reger
*Attorney, Agent, or Firm*—Carver & Co.

[57] ABSTRACT

A self-centering apparatus for caliper brake assembly to control relative positions of brake shoes so that they are equally spaced from the brake disc, irrespective of attitude of brake. The caliper brake assembly has a pair of caliper arms hinged to the body thereof, with brake shoes at inner ends of the arm and a brake actuator extending between outer portions of the arm. A rocker device is hinged to the body for rotation about a rocker axis disposed parallel to the hinge axes of the caliper arms, and the rocker links interconnect the caliper arms and the rocker device so that movement of one caliper arm is essentially equal and opposite to movement of the remaining caliper arm.

10 Claims, 4 Drawing Figures

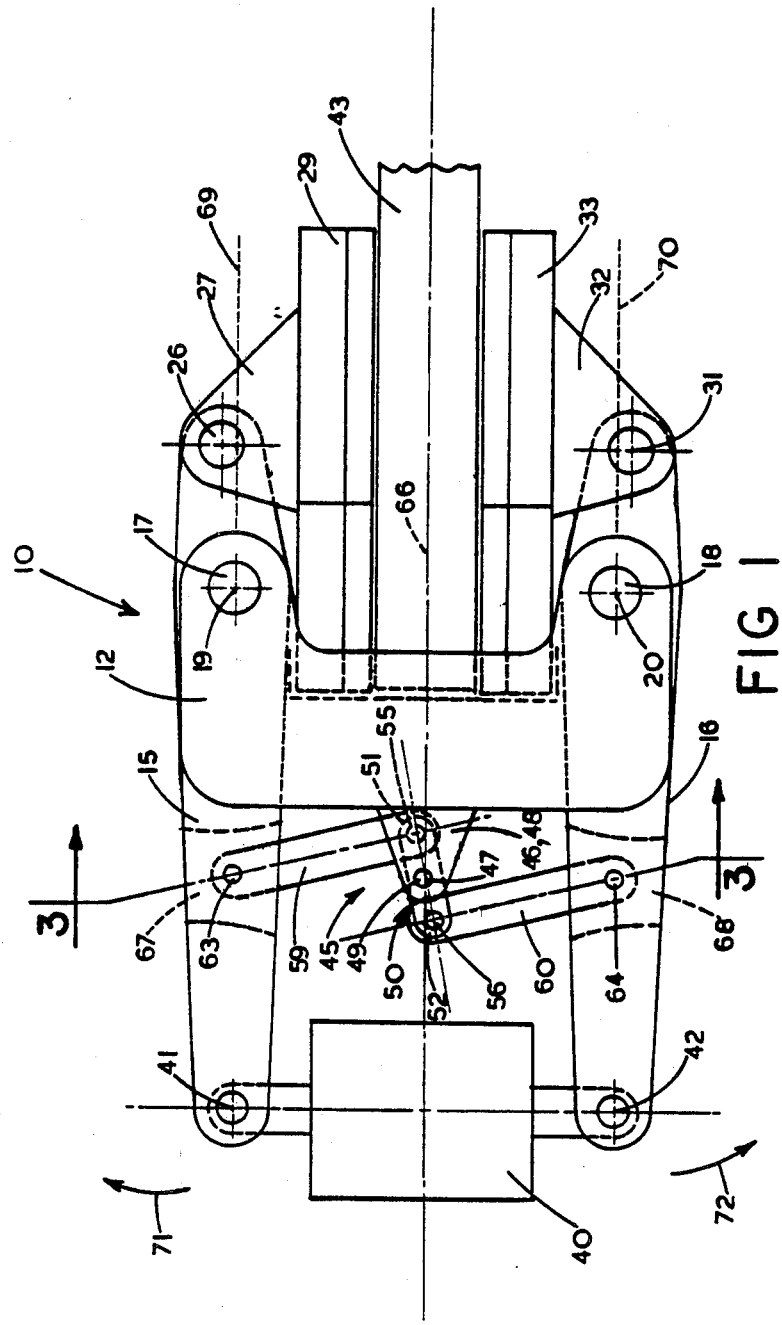

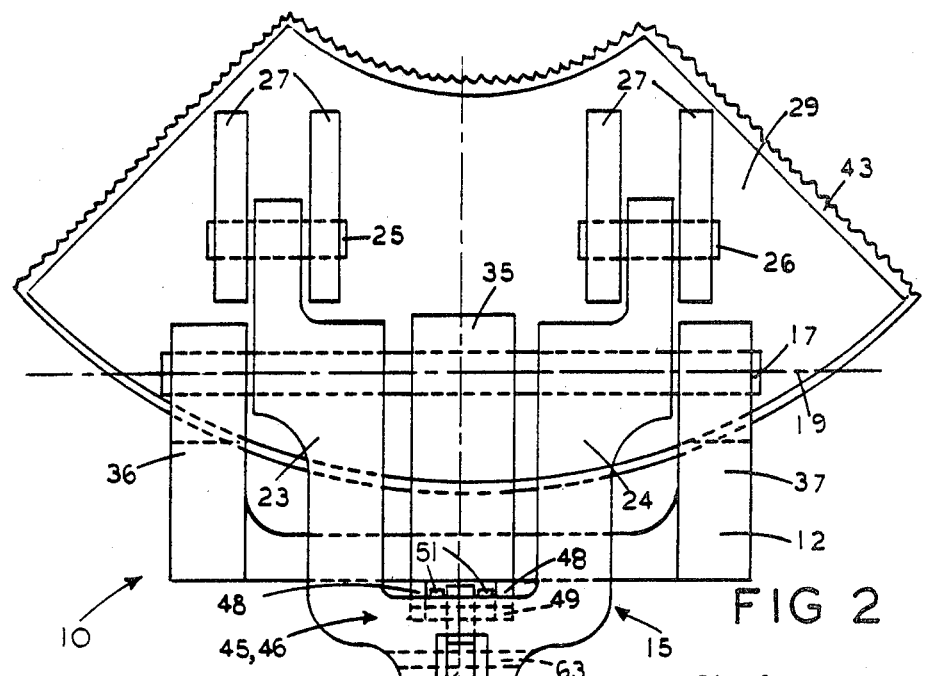
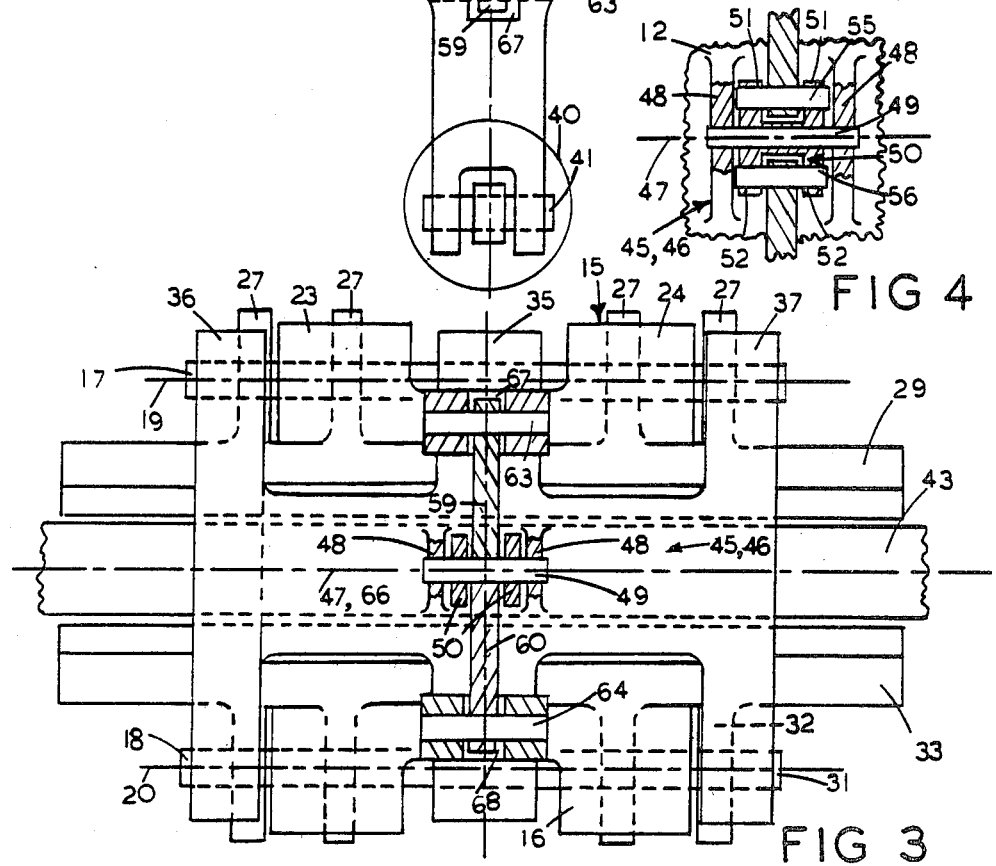

SELF-CENTERING DEVICE FOR CALIPER BRAKE ASSEMBLY

BACKGROUND OF THE INVENTION

1. Field of the Invention

The invention relates to a caliper brake assembly having means to self-center the brake shoes and to essentially equalize wear on each of the shoes.

2. Prior Art

There are many different types of caliper brake assemblies in which hinged arms carrying brake shoes are actuated by an extensible and retractable actuator fitted adjacent ends of the arms remote from the brake shoes. It is not unusual for caliper brakes of this type to suffer from uneven wear of the brake shoes due to differences in force between the brake shoes and the disc, or unequal travel of the brake shoes resulting in one shoe contacting the disc before the opposite shoe. Both of the above characteristics of prior art brake shoes can result in uneven wear of the brake shoes with corresponding premature replacement of the linings, usually because when the lining of one shoe has become hazardously thin, it is common practice to replace both linings when the brakes are serviced.

Various structures have been devised to reduce difficulties associated with the uneven wearing of brakes, for example an invention as described and claimed in the present inventor's U.S. Pat. No. 4,060,153 issued in 1977. This patent discloses a link hinged between a caliper arm on one side of the disc and a portion of a brake shoe on an opposite side of the disc. Two references cited against the above U.S. patent include U.S. Pat. No. 2,527,072 issued to Pogue and Australian Pat. No. 219,107. In these cited references, opposite shoes of the caliper brake assembly are interconnected by links which slidably engage the shoes.

SUMMARY OF THE INVENTION

The invention reduces the difficulties and disadvantages of the prior art by providing a simple interconnection between the two caliper arms which ensures that the arms move equally in opposite directions as the actuator is actuated. The invention can be easily incorporated on existing caliper brake assemblies without major design changes, possibly as a retrofit attachment so as to obtain the advantages of the invention. It is simple, of relatively low cost and does not require much additional space, and thus installation and maintenance problems are of little concern.

A self-centering apparatus according to the invention is for use with a caliper brake assembly in which the assembly includes a body and a pair of caliper arms hinged relative to the body for rotation about at least one arm hinge axis. The arms cooperate with brake shoes adjacent inner portions thereof and an actuator adjacent outer portions thereof. The self-centering apparatus is characterized by a rocker means adapted to be hinged freely to the body for rotation about a rocker axis disposed parallel to the hinge axis, and a pair of rocker links having outer portions thereof hinged to respective caliper arms at equal distances from respective hinge axis, and inner portions thereof hinged to the rocker means. Thus, movement of one caliper arm is then essentially equal and opposite to movement of the remaining caliper arm due to coupling between caliper arms by the rocker means and rocker links.

A detailed disclosure following, related to drawings, describes a preferred embodiment of the invention which is capable of expression in structure other than that particularly described and illustrated.

DESCRIPTION OF THE DRAWINGS

FIG. 1 is a simplified side elevation of a caliper brake assembly fitted with a self-centering apparatus according to the invention, with brake shoes thereof shown in a mid range position having a brake disc therebetween, a portion of the disc being shown fragmented, FIG. 2 is a simplified top plan of the caliper brake assembly of FIG. 1, a portion of the brake disc being shown fragmented, FIG. 3 is a simplified fragmented section taken generally on planes designated by arrows 3—3 of FIG. 1, some structure being omitted for clarity, and FIG. 4 is a simplified fragmented detail section of rocker means according to the invention.

DETAILED DISCLOSURE

FIGS. 1 through 4

A caliper brake assembly 10 has a body 12 and a pair of bifurcated caliper arms 15 and 16 hinged to the body for rotation about caliper arm hinge pins 17 and 18 having respective arm hinge axes 19 and 20. The arm 15 is bifurcated and divides adjacent an intermediate position thereof into two inner arm portions 23 and 24 which carry brake shoe pins 25 and 26 respectively which are journalled in lugs severally 27, carried on a brake shoe 29. The caliper arm 16 is similar, but only one brake shoe pin 31 is shown carried in a lug 32 of a brake shoe 33. The body 12 has a central portion 35 straddled by two outer portions 36 and 37 which receive the inner arm portions therebetween, the outer portions having aligned openings to receive the hinge pins, thus providing a sturdy caliper brake arrangement. A brake actuator 40, e.g., an extensible and retractable diaphragm air cylinder, extends between outer ends of the caliper arms and is journalled on actuator hinge pins 41 and 42 respectively. A brake disc 43 passes between the brake shoes 29 and 33 and, when the actuator is actuated, the shoes are brought into contact with the brake disc to brake the disc against rotation.

The above description refers to structure that is common to a typical prior art heavy duty caliper brake having a floating actuator disposed between two arms. Such an arrangement is characterized by simplicity, but suffers from the disadvantage that the brake shoes may wear unevenly due to poor centering on the disc. Also, when the disc is mounted horizontally, ie. with a vertical axis of rotation, the caliper assembly would likely be unbalanced so that even when the brake is disengaged, one of the shoes would likely rest against the brake disc which produces premature wear of the brake lining on that shoe during operation of the disc. The present invention is specifically designed to provide a caliper brake assembly in which the shoes thereof approach the disc symmetrically from each side of the disc so as to contact opposite faces of the disc essentially simultaneously, and also to hold both brake shoes off the disc when the caliper brake is disengaged, thus reducing uneven wear of one of the linings.

A rocker means 45 according to the invention includes a rocker mounting 46 secured at a mid position of the body 12 on the side of the body remote from the brake disc 43. The mounting has a pair of spaced ears 48 having aligned openings carrying a main rocker pin 49 disposed parallel to the caliper hinge pins 17 and 18 and having a rocker axis 47. A rocker member 50 has a central bore to accept the main rocker pin 49 and has two pairs of spaced projections 51 and 52 extending from opposite sides of the main bore thus defining a generally H-shaped member as best seen in FIG. 4. The pairs of spaced projections 51 and 52 each have aligned bores which carry respective rocker link pins 55 and 56 which are disposed parallel to, coplanar with and disposed on opposite sides of, the main rocker pin 49, and are spaced at equal distances therefrom.

Rocker links 59 and 60 have inner portions journalled on the rocker link pins 55 and 56 carried on the member 50, and outer portions journalled on wrist pins 63 and 64 respectively, the wrist pins being journalled in the caliper arms 15 and 16 respectively at equal distances from the respective arm hinge axes 19 and 20. The arms 15 and 16 have clearance openings 67 and 68 respectively across which the wrist pins 63 and 64 extend, the openings receiving the outer ends of the rocker links for swivelling therein about the respective wrist pins. It can be seen that the rocker member 50 is a rocker means hinged freely to the body 12 for rotation about the rocker axis 47, and having two journals, i.e. the rocker link pins 55 and 56, spaced at equal distances from, and on opposite sides of, the rocker axis. Also, the rocker axis 47 is disposed within an axis plane 66 located midway between, and disposed parallel to, a pair of parallel planes 69 and 70 containing the arm hinge axes 19 and 20. The axis plane 66 also passes approximately midway between the brake shoes. Thus, the rocker links serve as rocker link means and have outer portions hinged to the caliper arms at positions disposed between the caliper arm hinge axes and the outer portions of the caliper arms cooperating with the actuator, and have inner portions journalled on journals of the rocker means.

Clearly, the lengths of the rocker links are equal, and the spacings of the rocker link pins and the wrist pins from their respective hinge axes are selected so that the rocker means will not assume a position normal to the plane 66 when the brake shoes are spaced closest to each other and furthest from each other. This is to reduce possible problems associated with "over-centering" of the rocker means relative to the rocker links.

OPERATION

The caliper brake assembly 10 operates similarly to a conventional caliper brake, with the added advantage that the caliper arms move generally symmetrically towards, and away from, the brake disc. Referring to FIG. 1, as the actuator 40 is extended, the caliper arms 15 and 16 rotate about respective arm hinge axes 19 and 20 per arrows 71 and 72 respectively, that is the outer ends of the caliper arms move away from each other. This outwards movement draws the rocker links 59 and 60 away from the rocker axis 47, causing rotation of the rocker member about the rocker axis in direction of the arrow 72. Due to the coupling between the caliper arms by the rocker means and the rocker links, equal moment arms of the rocker links about the rocker axis 47, and also about the caliper arm hinge axes 19 and 20, movement of one caliper arm results in a corresponding equal but opposite movement of the other caliper arm. This maintains the brake shoes at generally equal distances from the brake disc, thus contributing for more even wear of the brake linings than would occur without the rocker means and associated structure. It can be seen that retraction of the actuator causes equal but opposite withdrawal of the brake shoes from the disc. When retracted, the rocker assembly tends to balance the remainder of the caliper brake assembly such that, when the disc is horizontal, there is little tendency for one shoe to rest on the disc due to weight of the shoe and associated linkings.

ALTERNATIVES AND EQUIVALENTS

The device is shown for use with a caliper brake assembly in which the caliper arms are hinged on spaced parallel arm hinge axes, and the rocker axis is disposed within a plane located midway between a pair of parallel planes containing the arm hinge axes. The rocker means could have applications in other types of caliper brake assemblies in which the caliper arms are hinged to the body for rotation about one hinge axis only, that is the caliper arms have a common hinge pin. This is appropriate in some situations and the present invention is easily applicable to this type of caliper brake assembly. Also, the actuator 40 is shown as single acting and in a "floating" actuator arrangement, ie. the actuator has one extensible rod and extends freely between the caliper arms and is not fixed to the body. If desired, the actuator could be fixed to the body and provided with two extensible rods so as to actuate such caliper arm separately, thus contrasting with the floating actuator.

I claim:

1. A caliper brake assembly having a body and a pair of caliper arms hinged relative to the body for rotation about at least one arm hinge axis, the arms cooperating with brake shoes adjacent inner portions of the arms and an actuator adjacent outer portions of the arms, the assembly being further characterized by:
    (a) a rocker means hinged freely to the body for rotation about a rocker axis disposed parallel to the hinge axis,
    (b) a pair of rocker links having outer portions thereof hinged to respective caliper arms at equal distances from the respective hinge axis, and inner portions thereof hinged to the rocker means,
so that movement of one caliper arm is essentially equal and opposite to movement of the remaining caliper arm due to coupling between the caliper arms by the rocker means and rocker links.

2. A caliper brake assembly as claimed in claim 1 wherein the caliper arms are hinged to the body about a pair of spaced parallel arm hinge axes, and the assembly is further characterized by:
    (a) the rocker axis being disposed within an axis plane located midway between, and disposed parallel to, a pair of parallel planes containing the arm hinge axes.

3. A caliper brake assembly as claimed in claim 2 in which the rocker axis is disposed on a side of the hinge axes remote from the brake shoe, and the axis plane passes approximately midway between the brake shoes.

4. A caliper brake assembly as claimed in claim 2 or 3 wherein the rocker links are hinged to the caliper arms at positions disposed between the caliper arm hinge axes and the outer portions of the caliper arms cooperating with the actuator.

5. A caliper brake assembly as claimed in claim 2 or 3 in which:
    (a) the rocker means is a rocker member having a pair of journals spaced at equal distances on opposite sides of the rocker axis, (b) the rocker links are of equal length and have the inner portions thereof journalled on the journals of the rocker arm.

6. A self-centering apparatus for a caliper brake assembly, in which the caliper brake assembly has a body and a pair of caliper arms hinged relative to the body for rotation about at least one arm hinge axis, the arms cooperating with brake shoes adjacent inner portions of the arms and an actuator adjacent outer portions of the arms, the self-centering apparatus being further characterized by:
  (a) a rocker means adapted to be hinged freely to the body for rotation about a rocker axis disposed parallel to the hinge axis,
  (b) a pair of rocker links having outer portions thereof adapted to be hinged to respective caliper arms at equal distances from the respective hinge axis, and inner portions thereof hinged to the rocker means,
so that movement of one caliper arm is essentially equal and opposite to movement of the remaining caliper arm due to coupling between the caliper arms by the rocker means and the rocker links.

7. A self-centering apparatus as claimed in claim 6 wherein the caliper arms are hinged to the body about a pair of spaced parallel arm hinge axes, and the apparatus is further characterized by:
  (a) the rocker axis being disposed within an axis plane located midway between, and disposed parallel to, a pair of parallel planes containing the arm hinge axes.

8. A self-containing apparatus as claimed in claim 6 or 7 in which the rocker axis is disposed on a side of the hinge axes remote from the brake shoes, and the axis plane passes midway between the brake shoes.

9. A self-centering apparatus as claimed in claim 6 or 7 wherein the rocker links are hinged to the caliper arms at positions disposed between the caliper arm hinge axes and the outer portions of the caliper arms cooperating with the actuator.

10. A self-centering apparatus as claimed in claim 6 or claim 7 in which:
  (a) the rocker means is a rocker member having a pair of journals spaced at equal distances on opposite sides of the rocker axis,
  (b) the rocker links are of equal length and have the inner portions thereof journalled on the journals of the rocker arm.

* * * * *